US012767152B2

(12) United States Patent
Park et al.

(10) Patent No.: US 12,767,152 B2
(45) Date of Patent: Oct. 20, 2026

(54) APPARATUS AND METHOD FOR CONTROLLING VEHICLE USING MOTION SICKNESS MODEL

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Tae Woong Park, Hwaseong (KR); Chang Seop An, Incheon (KR); Chung Choo Chung, Seoul (KR); Jin Sung Kim, Seoul (KR); Ying Shuai Quan, Seoul (KR)

(73) Assignees: Hyundai Motor Company, Seoul (KR); Kia Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 79 days.

(21) Appl. No.: 18/791,682

(22) Filed: Aug. 1, 2024

(65) Prior Publication Data

US 2025/0115255 A1 Apr. 10, 2025

(30) Foreign Application Priority Data

Oct. 6, 2023 (KR) ........................ 10-2023-0133517

(51) Int. Cl.
*B60W 50/00* (2006.01)

(52) U.S. Cl.
CPC .... *B60W 50/0098* (2013.01); *B60W 50/0097* (2013.01); *B60W 2540/22* (2013.01); *B60W 2540/223* (2020.02); *B60W 2540/225* (2020.02)

(58) Field of Classification Search
CPC ............. B60W 40/08; B60W 50/0097; B60W 50/0098; B60W 2540/22; B60W 2540/225; B60W 2540/223
See application file for complete search history.

(56) References Cited

U.S. PATENT DOCUMENTS

| | | | | |
|---|---|---|---|---|
| 2022/0001894 | A1* | 1/2022 | Yeom | B60W 40/08 |
| 2022/0024459 | A1* | 1/2022 | Park | B60W 50/16 |

(Continued)

FOREIGN PATENT DOCUMENTS

| | | | | |
|---|---|---|---|---|
| CN | 114633758 A | * 6/2022 | | B60W 50/00 |
| KR | 20210119239 A | * 10/2021 | | B60W 40/08 |

OTHER PUBLICATIONS

J.H. Hong et al., "Adaptive Cruise Control with Motion Sickness Reduction: Data-driven Human Model and Model Predictive Control Approach", 2022 IEEE 25th International Conference on Intelligent Transportation Systems (ITSC), Oct. 8-12, 2022, Macau, China.

(Continued)

*Primary Examiner* — Peter D Nolan
*Assistant Examiner* — Ce Li Li
(74) *Attorney, Agent, or Firm* — Fox Rothschild LLP

(57) ABSTRACT

An apparatus for controlling a vehicle includes at least one sensor to obtain status data of a user of the vehicle and data related to a motion of the user, and a processor to generate at least one motion sickness model, based on the status data of the passenger and the data related to the motion of the passenger, which are previously obtained, select a motion sickness model corresponding to the status data of the user, from among the at least one motion sickness model, and predict a motion sickness index of the user, by inputting the data related to the motion of the user into the selected motion sickness model.

19 Claims, 8 Drawing Sheets

(56) References Cited

U.S. PATENT DOCUMENTS

| | | | | |
|---|---|---|---|---|
| 2023/0293086 A1* | 9/2023 | Maeda | A61B 5/163 600/595 |
| 2025/0018979 A1* | 1/2025 | Harkleroad | A61B 5/05 |
| 2025/0108788 A1* | 4/2025 | Maeda | B60W 40/08 |
| 2025/0108834 A1* | 4/2025 | Singh | B60W 30/182 |

OTHER PUBLICATIONS

J.E. Bos et al., "Modelling motion sickness and subjective vertical mismatch detailed for vertical motions", Brain Research Bulletin, 47(5), pp. 537-542 (1998).
N. Kamiji et al., "Modeling and Validation of Carsickness Mechanism", SICE Annual Conference 2007, Sep. 17-20, 2007, Kagawa University, Japan.
C. Braccesi et al., "Motion sickness. Part 1: development of a model for predicting motion sickness incidence", Int. J. Human Factors Modelling and Simulation, 2(3), pp. 163-187 (2011).
S.A. Saruchi et al., "Lateral control strategy based on head movement responses for motion sickness mitigation in autonomous vehicle", Journal of the Brazilian Society of Mechanical Sciences and Engineering, vol. 42, pp. 1-14 (2020).

* cited by examiner

APPARATUS AND METHOD FOR CONTROLLING VEHICLE USING MOTION SICKNESS MODEL

CROSS-REFERENCE TO RELATED APPLICATION

This application claims under 35 U.S.C. § 119(a) the benefit of Korean Patent Application No. 10-2023-0133517 filed in the Korean Intellectual Property Office on Oct. 6, 2023, the entire contents of which are incorporated herein by reference.

BACKGROUND

(a) Technical Field

The present disclosure relates to an apparatus and a method for controlling a vehicle, more particularly, to the apparatus and method for controlling the vehicle, capable of controlling the operation of the vehicle by reflecting a motion sickness index predicted through a motion sickness model.

(b) Description of the Related Art

Motion sickness of a passenger inside a vehicle during driving may be caused due to a discrepancy between information about motion, which is felt by the passenger in a vestibular organ, and visual information of the passenger. In other words, motion sickness typically is caused by sensory errors or sensory collisions, because the vestibular organ feels a turn as the vehicle turns, but the gaze of the passenger does not turn concurrently.

When the passenger inside the vehicle feels motion sickness due to the above causes, the passenger feels uncomfortable. In severe cases, the passenger may want to get out while the vehicle is travelling.

Recently, there has been development of technology for minimizing motion sickness of a passenger in order to improve the comfort of the passenger while the vehicle is in motion. Accordingly, a motion sickness model (MS model) has been developed to output a motion sickness index using the motion of a head of the passenger.

However, the motion sickness index indicates probability of motion sickness based on the behavior of the passenger resulting from the same operation repeated for a preset period of time, which has a limitation in terms of accuracy in expressing the motion sickness extent of the passenger. Accordingly, there is a need to develop a technology of predicting a motion sickness index by more accurately expressing the motion sickness extent of the passenger, based on the behavior of the passenger, such that the comfort of the passenger may be improved.

SUMMARY

An aspect of the present disclosure provides an apparatus and a method for controlling a vehicle, which may be capable of predicting a motion sickness index to more accurately represent a motion sickness extent of a user, depending on motion of the user.

Another aspect of the present disclosure provides an apparatus and a method for controlling a vehicle, which may be capable of generating a motion sickness model for predicting a motion sickness index of a user, based on the motion of the passenger and a misery scale (MISC) measured by the passenger.

Another aspect of the present disclosure provides an apparatus and a method for controlling a vehicle, capable of predicting a motion sickness index of a user through a motion sickness model generated based on the motion of a passenger and a misery scale measured by the passenger, and controlling the operation of the vehicle based on the predicted motion sickness index to minimize the motion sickness of the user.

As used herein, terms such as user, driver, and passenger refer to occupants of a vehicle, and may be used interchangeably in order to reflect motion sickness experienced by a person who occupies a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a vehicle, may include at least one sensor configured to obtain status data of a user of the vehicle and data related to a motion of the user, and a processor configured to generate at least one motion sickness model, based on status data of the passenger and the data related to the motion of the passenger, which are previously obtained, select a motion sickness model corresponding to the status data of the user, from among the at least one motion sickness model, and predict a motion sickness index of the passenger, by inputting the data related to the motion of the user into the selected motion sickness model.

According to an embodiment, the sensor may obtain the status data of the passenger and the data related to the motion of the passenger.

According to an embodiment, the status data may include a seating position and a gaze direction.

According to an embodiment, the processor may generate the at least one motion sickness model depending on the seating position of the passenger and the gaze direction of the passenger.

According to an embodiment, the processor may generate the motion sickness model to pre-process the data related to the motion of the passenger, input the pre-processed result into a conflict model, transform a conflict vector, which is output from the conflict model, into a sickness severity, and calculate a motion sickness index of the passenger, based on the sickness severity.

According to an embodiment, the processor may transform the conflict vector, which is output from the conflict model, into the motion sickness severity through a hill function.

According to an embodiment, the processor may calculate the motion sickness index of the passenger using a cumulation function based on the motion sickness severity.

According to an embodiment, the processor may allow an input of a misery scale, which is sensed by the passenger, corresponding to a motion sickness extent to obtain the misery scale.

According to an embodiment, the processor may set a parameter included in a time cumulation function based on the misery scale input by the passenger.

According to an embodiment, the processor may control an operation of the vehicle, based on the predicted motion sickness index.

A vehicle may include the apparatus for controlling the vehicle.

According to another aspect of the present disclosure, a method for controlling a vehicle, may include obtaining status data of a user of the vehicle and data related to a motion of the user by at least one sensor, generating at least one motion sickness model, based on the status data of the passenger and the data related to the motion of the passenger, which are previously obtained, selecting a motion sickness model corresponding to the status data of the user, from among the at least one motion sickness model, and predicting a motion sickness index of the user, by inputting the data related to the motion of the user into the selected motion sickness model.

According to an embodiment, the method may further include obtaining the status data of the passenger and the data related to the motion of the passenger by the at least one sensor.

According to an embodiment, the status data may include a seating position and a gaze direction.

According to an embodiment, the method may further include generating the at least one motion sickness model depending on the seating position of the passenger and the gaze direction of the passenger.

According to an embodiment, the method may further include generating the motion sickness model to pre-process the data related to the motion of the passenger, input the pre-processed result into a conflict model, transform a conflict vector, which is output from the conflict model, into a sickness severity, and calculate a motion sickness index of the passenger, based on the sickness severity.

According to an embodiment, the method may further include transforming the conflict vector, which is output from the conflict model, into the motion sickness severity through a hill function.

According to an embodiment, the method may further include calculating the motion sickness index of the passenger using a cumulation function based on the motion sickness severity.

According to an embodiment, the method may further include allowing an input of a misery scale, which is sensed by the passenger, corresponding to a motion sickness extent to obtain the misery scale.

According to an embodiment, the method may further include setting a parameter included in a time cumulation function based on the misery scale input by the passenger.

According to an embodiment, the method may further include controlling an operation of the vehicle, based on the predicted motion sickness index.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
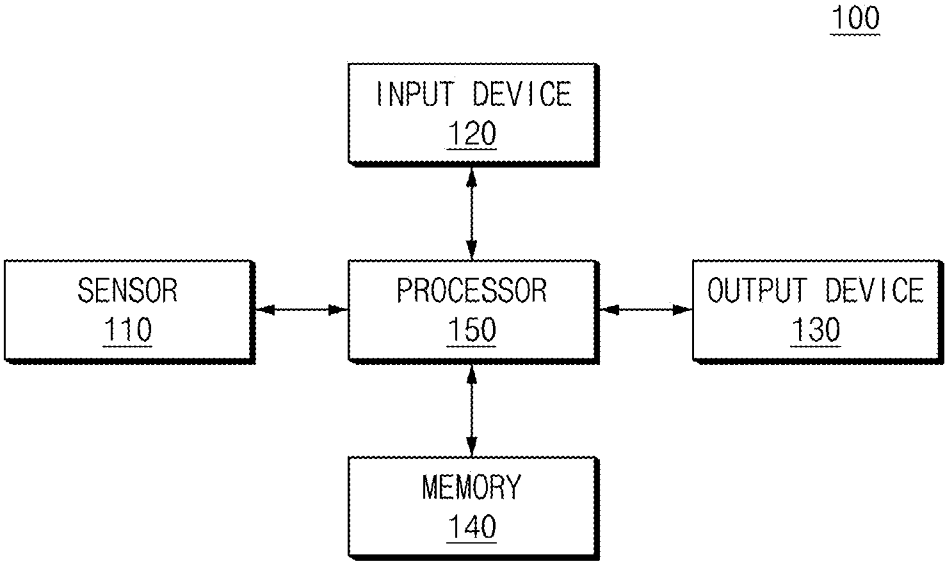
FIG. 1 is a view illustrating the configuration of an apparatus for controlling a vehicle, according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", "(a)", "(b)", and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating the configuration of an apparatus for controlling a vehicle, according to an embodiment of the present disclosure.

As illustrated in FIG. 1, an apparatus 100 for controlling a vehicle may include a sensor 110, an input device 120, an output device 130, a memory 140, and a processor 150.

The sensor 110 may obtain status data of a user, and data related to the motion of the user. In this case, the user may be a target for minimizing motion sickness by applying a motion sickness index predicted through a motion sickness model generated according to an embodiment of the present disclosure. Accordingly, the sensor 110 may obtain status data of a passenger, and data related to the motion of the passenger. In this case, the passenger may be a counterpart that provides data for generating a motion sickness model for predicting a motion sickness index, according to an embodiment of the present disclosure. The status data may include a seating position and a gaze direction. To this end, the sensor 110 may include a seat sensor to sense the seating position of the user or the passenger and an image sensor to obtain a gaze image. According to an embodiment, the image sensor may be included in a camera provided inside the vehicle.

According to an embodiment, the sensor 110 may include an acceleration sensor, a gyroscope sensor, an inertial navigation system (INS), an inertia measurement unit (IMU), an attitude reference system (ARS), or an attitude heading reference system (AHRS) attached to at least one specific position of a user or a passenger to obtain data related to the motion of the user. The specific position of the user or passenger may include a head, a chest, or an abdomen. The data related to the motion of the user or the data related to the motion of the passenger may include information about six degrees of freedom (6 DOF), information about longitudinal acceleration, information about lateral acceleration, information about vertical acceleration, information about a speed, or information about a position in relation to the specific position of the user or the passenger. The information about the specific position to which the sensor 110 is attached and the information about the 6 DOF will be described in detail with reference to FIG. 2.

Figure 2:
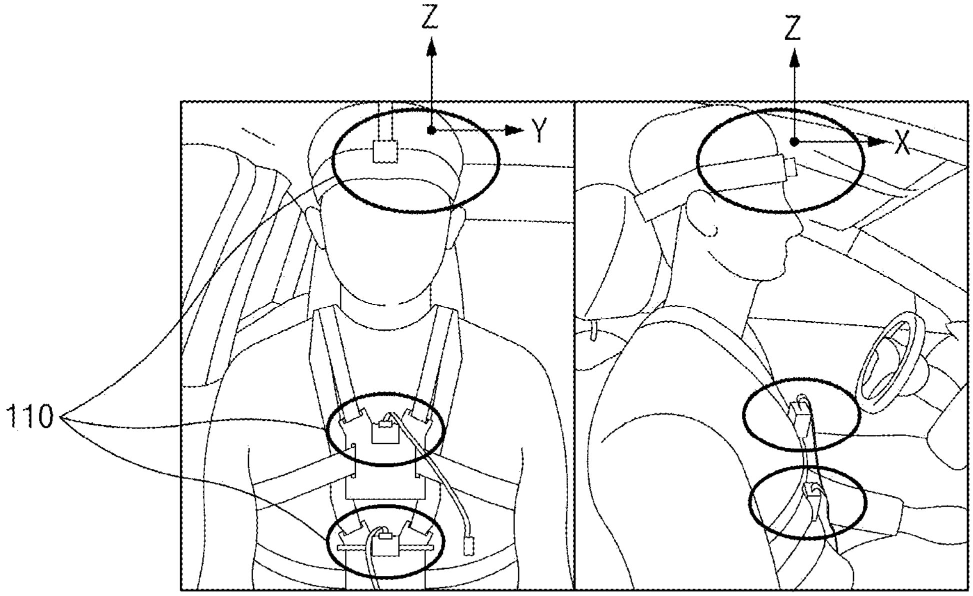
FIG. 2 is a view schematically illustrating a position of a sensor, according to an embodiment of the present disclosure.

FIG. 2 is a view schematically illustrating a position of a sensor, according to an embodiment of the present disclosure.

As illustrated in FIG. 2, the 6 DOF obtained by the sensor 110 may include information about a motion direction in relation to the specific position of the user or the passenger. In detail, the 6 DOF may include X-axis data in front and rear directions of the user or passenger, Y-axis data in left and right directions of the user or passenger, Z-axis data in up and down directions of the user or passenger, Pitch data indicating the degree of rotation based on an X axis, Roll data indicating the degree of rotation based on a Y axis, and Yaw data indicating the degree of rotation based on a Z axis.

Referring to FIG. 1, the input device 120 may receive an input corresponding to a touch, a motion, or a voice of the user or passenger and transmit the input to the processor 150. The processor 150 may control the operation of the apparatus for controlling the vehicle to correspond to the input information. According to an embodiment, the input device 120 may include a touch-type input device or a mechanical input device. The details thereof will be made with reference to FIG. 3.

Figure 3:
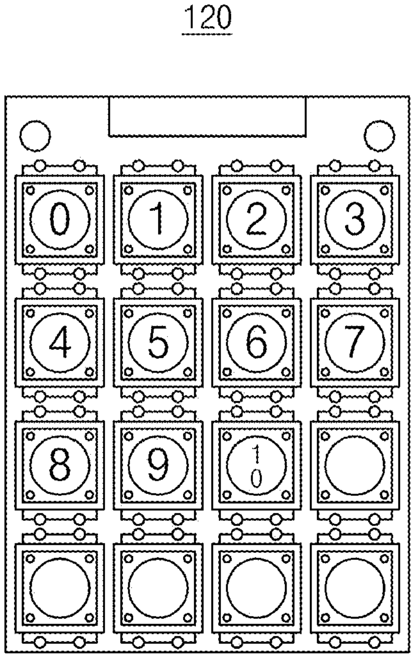
FIG. 3 is a view illustrating schematically an input device, according to an embodiment of the present disclosure.

FIG. 3 is a view illustrating schematically an input device, according to an embodiment of the present disclosure.

As illustrated in FIG. 3, the input device 130 may be provided at a position for making an input by a passenger seated on a seat, and may be implemented with buttons marked with numeric values ranging from "0" to "10". In this case, the numeric value of the input device 120 may represent a misery scale (MISC) for indicating a motion sickness extent by sensed by the passenger. The MISC of "0" indicates that the passenger does not feel motion sickness, and the MISC of "10" indicates that the passenger is vomiting due to the severe motion sickness.

Referring back to FIG. 1, the output device 130 may output an image or a sound under the control of the processor 150. According to an embodiment, the output device 130 may output a guide message allowing the passenger to input the MSCI for indicating the motion sickness extent sensed by the passenger. The output device 130 may be implemented with a display device or a sound output device. In this case, the display device may include a head up display (HUD) or cluster. According to an embodiment, the display device may be implemented with a display that employs a liquid crystal display (LCD) panel, a light emitting diode (LED) panel, an organic light emitting diode (OLED) panel, or a plasma display panel (PDP). The LCD may include a thin film transistor-LCD (TFT-LCD). The display device may be integrally implemented with the input device 120 through a touch screen panel (TSP).

The memory 140 may store at least one algorithm to compute or execute various instructions for the operation of the vehicle control device according to an embodiment of the present disclosure. According to an embodiment, the memory 140 may store at least one instruction executed by the processor 150, and the instruction may allow the vehicle control apparatus to operate according to an embodiment. The memory 140 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The processor 150 may be implemented by various processing devices, such as a microprocessor embedded therein with a semiconductor chip to operate or execute various instructions, and may control the vehicle control apparatus according to an embodiment. The processor 150 may be electrically connected to the sensor 110, the input device 120, the output device 130, and the memory 140 through a wired cable or various circuits to transmit an electrical signal including a control command to execute an arithmetic operation or data processing related to a control operation and/or communication. The processor 150 may include at least one of a central processing unit, an application processor, a communication processor (CP), or the combination thereof.

The processor 150 may generate at least one motion sickness model (MSD_motion sickness damage model), based on the status data of the passenger and the data related to the motion of the passenger, which are obtained from the passenger.

The processor 150 may obtain the status data of the passenger and the data related to the motion of the passenger, from the sensor 110 to generate the motion sickness model. According to an embodiment, the processor 150 may obtain the information about the motion direction of the specific position of the user or passenger. In detail, the information about the motion direction may include X-axis data in front and rear directions of the user or passenger, Y-axis data in left and right directions of the user or passenger, Z-axis data in up and down directions of the user or passenger, Pitch data indicating the degree of rotation based on an X axis, Roll data indicating the degree of rotation based on a Y axis, and Yaw data indicating the degree of rotation based on a Z axis.

The processor 150 may select data necessary to measure the motion sickness of the passenger, among data obtained from the sensor 110. According to an embodiment, the processor 150 may select data resulting from the motion of the head of the user or passenger through Fast Fourier Transform.

The processor 150 may pre-process the selected data. Accordingly, the processor 150 may remove noise of the sensor 110, which is included in the data obtained from the sensor 110. According to an embodiment, the processor 150 may remove the nose of the data selected through filtering based on a filter algorithm. According to an embodiment, the processor 150 may remove the nose of the data selected through a Kalman filter, a High Pass filter, a low pass filter.

The processor 150 may generate at least one motion sickness model (MSD_motion sickness damage model), based on the pre-processed data.

According to an embodiment, the processor 150 may generate the motion sickness model to input the pre-processed data into a conflict model, transform a conflict vector output from the conflict model into a motion sickness severity, and calculate the motion sickness index based on the motion sickness severity. The details thereof will be described with reference to FIG. 4.

Figure 4:
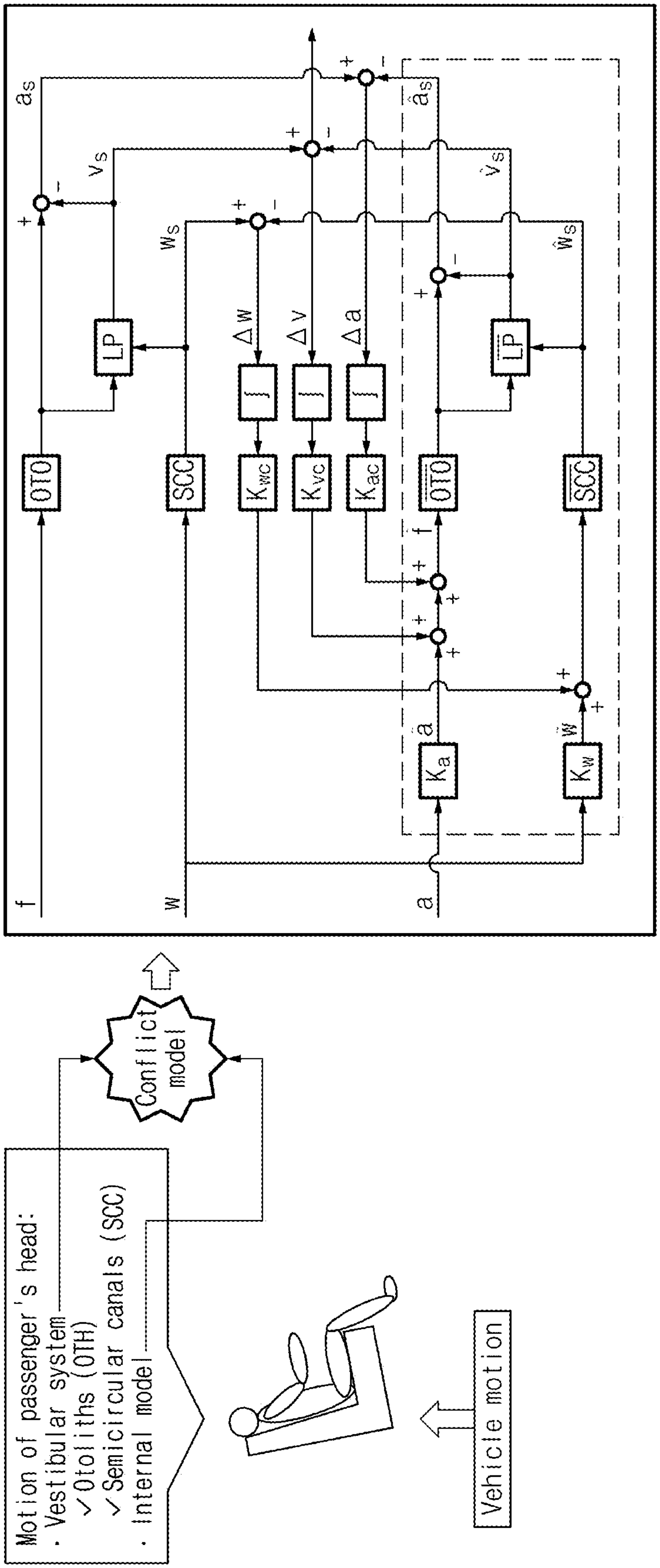
FIG. 4 is a view illustrating a conflict model generated, according to an embodiment of the present disclosure.

FIG. 4 is a view illustrating a conflict model generated, according to an embodiment of the present disclosure.

As illustrated in FIG. 4, the processor 150 may generate the conflict model through the modeling for the mismatching between the motion of the passenger, which is sensed in the otolith (OTO) and semicircular (SCC) of the passenger, based on the vehicle motion and the internal model of the passenger, The processor 150 may input, into the conflict model, a gravitational acceleration (f), an angular velocity (ω) in the roll, pitch, and yaw directions, and a pure acceleration (a), and obtain a conflict vector output from the conflict model.

The processor 150 may model the motion sickness model for predicting the motion sickness index of the passenger, based on the conflict vector, when the conflict vector is output from the conflict model. The details thereof will be described with reference to FIG. 5.

Figure 5:
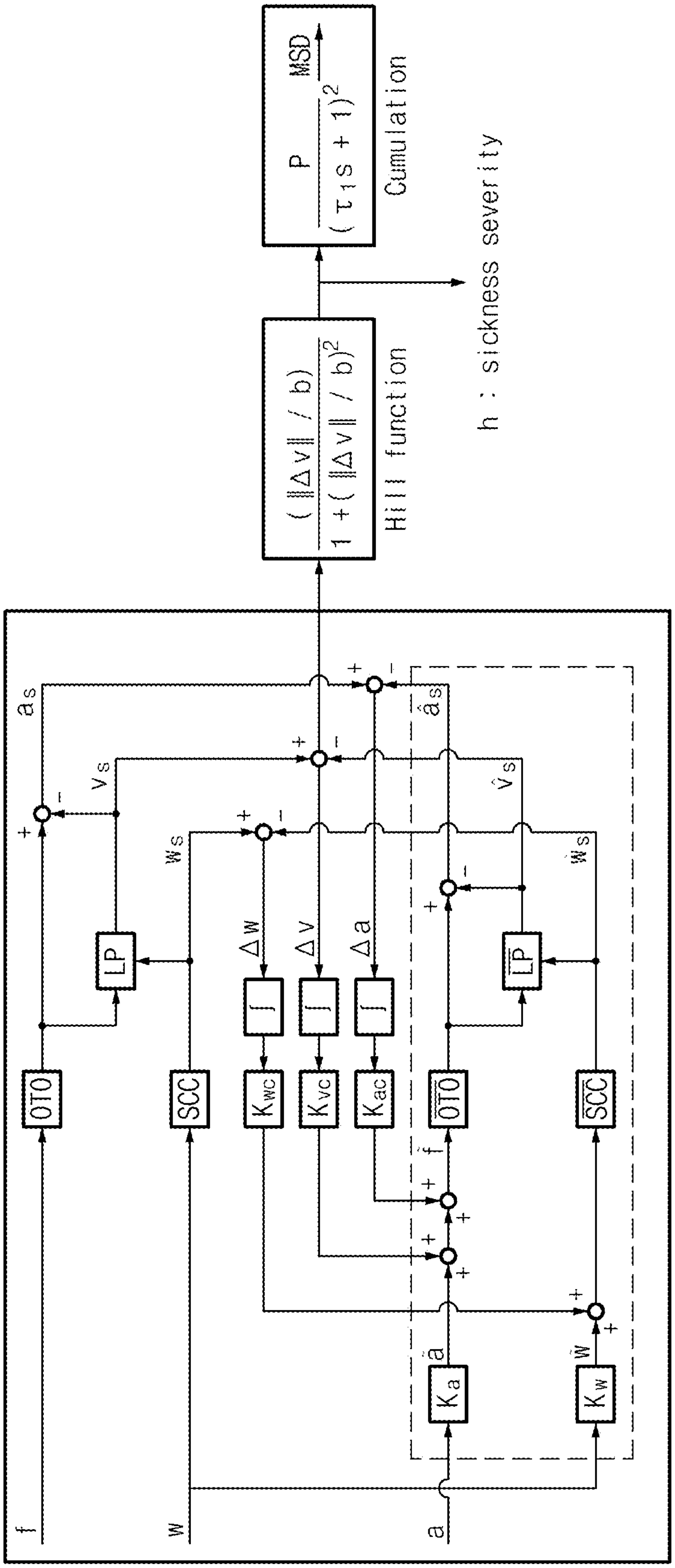
FIG. 5 is a view schematically illustrating a manner for predicting a motion sickness index based on a motion sickness model, according to an embodiment of the present disclosure.

FIG. 5 is a view schematically illustrating a manner for predicting a motion sickness index based on a motion sickness model, according to an embodiment of the present disclosure.

As illustrated in FIG. 5, the processor 150 may transform the conflict vector into the sickness severity, when the conflict vector is output from the conflict model. According to an embodiment, the processor 150 may transform a conflict vector (Δv) into a motion sickness severity (h) through a hill function. In the hill function, a parameter "b" is a tuning parameter to determine the form of the hill function.

When the processor 150 may calculate the motion sickness index using a cumulation function based on the motion sickness severity, when the motion sickness severity is calculated through the hill function.

The processor 150 may allow an input of the MISC, which is sensed by the passenger, corresponding to a motion sickness extent through the input device 120 to obtain the MISC sensed by the passenger. The processor 150 may adjust a parameter included in a time cumulation function such that the motion sickness index calculated using the time cumulation function based on the motion sickness severity follows the MISC obtained by the passenger. According to an embodiment, the processor 150 may set the parameter "τ" included in the time cumulation function to a time in which the motion of the passenger is sensed, and may set the parameter "P" to the maximum value of the MISC input for the time at which the motion of the passenger is sensed.

According to an embodiment, the processor 150 may generate at least one motion sickness model (multi-motion sickness model) depending on the seating position of the passenger and the gaze direction of the passenger. The details thereof will be described with reference to FIG. 6.

Figure 6:
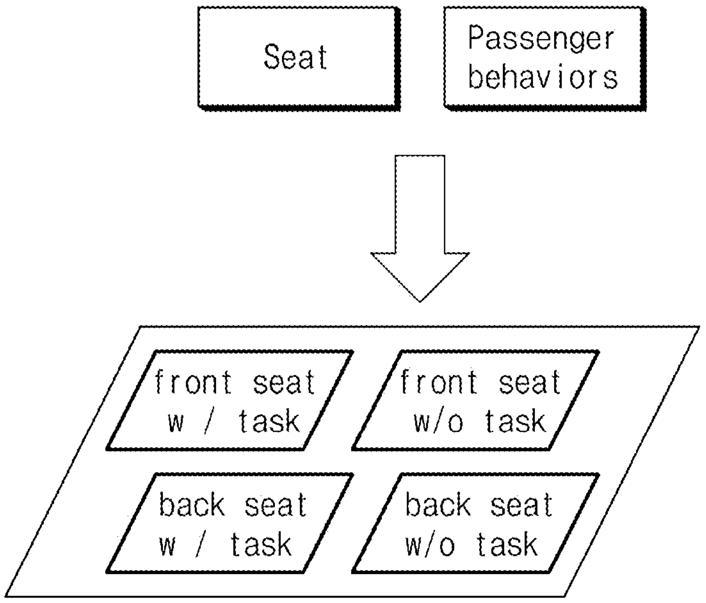
FIG. 6 is a view schematically illustrating a manner for generating a multi-motion sickness model, according to an embodiment of the present disclosure.

FIG. 6 is a view schematically illustrating a manner for generating a multi-motion sickness model, according to an embodiment of the present disclosure.

As illustrated in FIG. 6, the processor 150 may divide the seating position of the passenger into a position of a front seat and a position of a back seat, and generate a first motion sickness model and a second motion sickness model depending on the case that the passenger have the front seat and the gaze direction of the passenger is toward the interior (the state that the gaze of the passenger is focused on a specific thing interiors, for example, that case the passenger views a video; front seat w/task), and the case that the passenger have the front seat and the gaze direction of the passenger is toward the exterior (the state that the passenger stares at a front portion of the vehicle, in a comfortable state, front seat w/o task.) In addition, the processor 150 may generate a third motion sickness model and a fourth motion sickness model depending on a case that the passenger has a back seat and the gaze direction of the passenger is toward the interior (back seat w/task), and a case that the passenger has the back seat and the gaze direction of the passenger is toward the exterior (back seat w/o task).

The processor 150 may obtain the status data of a target to be predicted in motion sickness index, data related to the motion of the target, that is, may obtain the status data of the user and the data related to the motion of the user. According to an embodiment, the processor 150 may obtain the seating position and the gaze direction of the user.

The processor 150 may select the motion sickness model corresponding to the status data (the seating position and the gaze direction) of the user, from among the multi-motion sickness model.

For example, the processor 150 may select the third motion sickness model from among the multi-motion sickness model which is previously generated, when the user has the back seat and the gaze direction of the user is toward the interior.

The processor 150 may predict the motion sickness index of the user, by inputting the data related to the motion of the user into the motion sickness model selected, when the motion sickness model is selected corresponding to the seating position and the gaze direction of the user.

The processor 150 may control the operation of the vehicle, based on a motion sickness index predicted, when the motion sickness index of the user is predicted.

According to an embodiment, the processor 150 may control the driving of the vehicle or output a guide message through the output device 130, such that the user minimizes the motion sickness based on the predicted motion sickness index. Accordingly, the processor 150 may minimize the uncomfortable degree of the user during the driving of the vehicle, by minimizing the motion sickness of the user, based on the predicted motion sickness index of the user.

Figure 7:
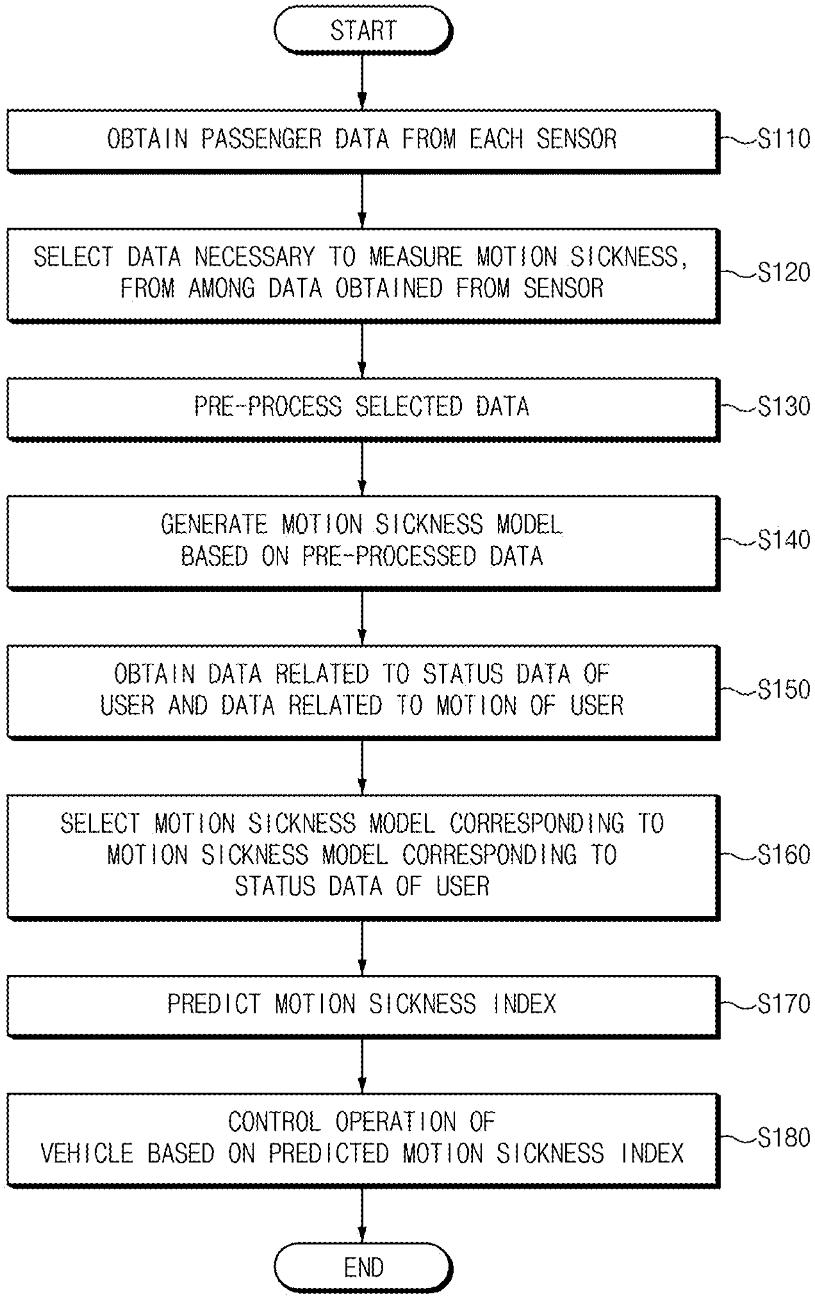
FIG. 7 is a flowchart illustrating a method for controlling a vehicle, according to an embodiment of the present disclosure.

FIG. 7 is a flowchart illustrating a method for controlling a vehicle, according to an embodiment of the present disclosure.

As illustrated in FIG. 7, the processor 150 may obtain the status data of the passenger and the data related to the motion of the passenger, from the sensor 110 to generate A motion sickness model.

According to an embodiment, in S110, the processor 150 may obtain the information about the motion direction of the specific position of the user or passenger. In detail, the information about the motion direction may include X-axis data in front and rear directions of the user or passenger, Y-axis data in left and right directions of the user or passenger, Z-axis data in up and down directions of the user or passenger, Pitch data indicating the degree of rotation based on an X axis, Roll data indicating the degree of rotation based on a Y axis, and Yaw data indicating the degree of rotation based on a Z axis.

The processor 150 may select data necessary to measure the motion sickness of the passenger, among data obtained from the sensor 110 (S120).

According to an embodiment, in S120, the processor 150 may select data resulting from the motion of the head of the user or passenger through Fast Fourier Transform.

The processor 150 may pre-process the selected data (S130). In S130, the processor 150 may remove noise of the sensor 110, which is included in the data obtained from the sensor 110. According to an embodiment, the processor 150 may remove the nose of the data selected through filtering based on a filter algorithm. According to an embodiment, the processor 150 may remove the nose of the data selected through a Kalman filter, a High Pass filter, a low pass filter.

The processor 150 may generate at least one motion sickness model (MSD_motion sickness damage model), based on the pre-processed data (S140).

According to an embodiment, in S140, the processor 150 may generate the motion sickness model to input the pre-processed data into a conflict model, transform a conflict vector output from the conflict model into a motion sickness severity, and calculate the motion sickness index based on the motion sickness severity.

According to an embodiment, the processor 150 may generate the conflict model through the modeling for the mismatching between the motion of the passenger, which is sensed in the otolith (OTO) and semicircular (SCC) of the passenger, based on the vehicle motion and the internal model of the passenger, The processor 150 may input, into the conflict model, a gravitational acceleration (f), an angular velocity (ω) in the roll, pitch, and yaw directions, and a pure acceleration (a), and obtain a conflict vector output from the conflict model.

The processor 150 may model the motion sickness model for predicting the motion sickness index of the passenger, based on the conflict vector, when the conflict vector is output from the conflict model.

According to an embodiment, the processor 150 may transform the conflict vector into the sickness severity, when the conflict vector is output from the conflict model. According to an embodiment, the processor 150 may transform a conflict vector (Δv) into a motion sickness severity (h) through a hill function. In the hill function, a parameter "b" is a tuning parameter to determine the form of the hill function.

When the processor 150 may calculate the motion sickness index using a cumulation function based on the motion sickness severity, when the motion sickness severity is calculated through the hill function.

The processor 150 may allow an input of the MISC, which is sensed by the passenger, corresponding to a motion sickness extent through the input device 120 to obtain the MISC sensed by the passenger. The processor 150 may adjust a parameter included in a time cumulation function such that the motion sickness index calculated using the time cumulation function based on the motion sickness severity follows the MISC obtained by the passenger. According to an embodiment, the processor 150 may set the parameter "τ" included in the time cumulation function to a time in which the motion of the passenger is sensed, and may set the parameter "P" to the maximum value of the MISC input for the time at which the motion of the passenger is sensed.

The processor 150 may generate at least one motion sickness model (multi-motion sickness model) depending on the seating position of the passenger and the gaze direction of the passenger.

According to an embodiment, the processor 150 may divide the seating position of the passenger into a position of a front seat and a position of a back seat, and generate a first motion sickness model and a second motion sickness model depending on the case that the passenger have the front seat and the gaze direction of the passenger is toward the interior (the state that the gaze of the passenger is focused on a specific thing interiors, for example, that case the passenger views a video; front seat w/task), and the case that the passenger have the front seat and the gaze direction of the passenger is toward the exterior (the state that the passenger stares at a front portion, in a comfortable state, front seat w/o task). In addition, the processor 150 may generate a third motion sickness model and a fourth motion sickness model depending on a case that the passenger has a back seat and the gaze direction of the passenger is toward the interior (back seat w/task), and a case that the passenger has the back seat and the gaze direction of the passenger is toward the exterior (back seat w/o task).

The processor 150 may obtain the status data of a target to be predicted in motion sickness index, data related to the motion of the target, that is, may obtain the status data of the user and the data related to the motion of the user (S150).

According to an embodiment, in S150, the processor 150 may obtain the seating position and the gaze direction of the user.

The processor 150 may select the motion sickness model corresponding to the status data (the seating position and the gaze direction) of the user (S160).

In S160, for example, the processor 150 may select the third motion sickness model from among the multi-motion sickness model which is previously generated, when the user has the back seat and the gaze direction of the user is toward the interior.

The processor 150 may predict the motion sickness index of the user, by inputting the data related to the motion of the user into the motion sickness model selected, when the motion sickness model is selected corresponding to the seating position and the gaze direction of the user (S170).

The processor 150 may control the operation of the vehicle, based on a motion sickness index predicted, when the motion sickness index of the user is predicted (S180).

According to an embodiment, in S180, the processor 150 may control the driving of the vehicle or output a guide message through the output device 130, such that the user minimizes the motion sickness based on the predicted motion sickness index. Accordingly, the processor 150 may minimize the uncomfortable degree of the user during the driving of the vehicle, by minimizing the motion sickness of the user, based on the predicted motion sickness index of the user.

Figure 8:
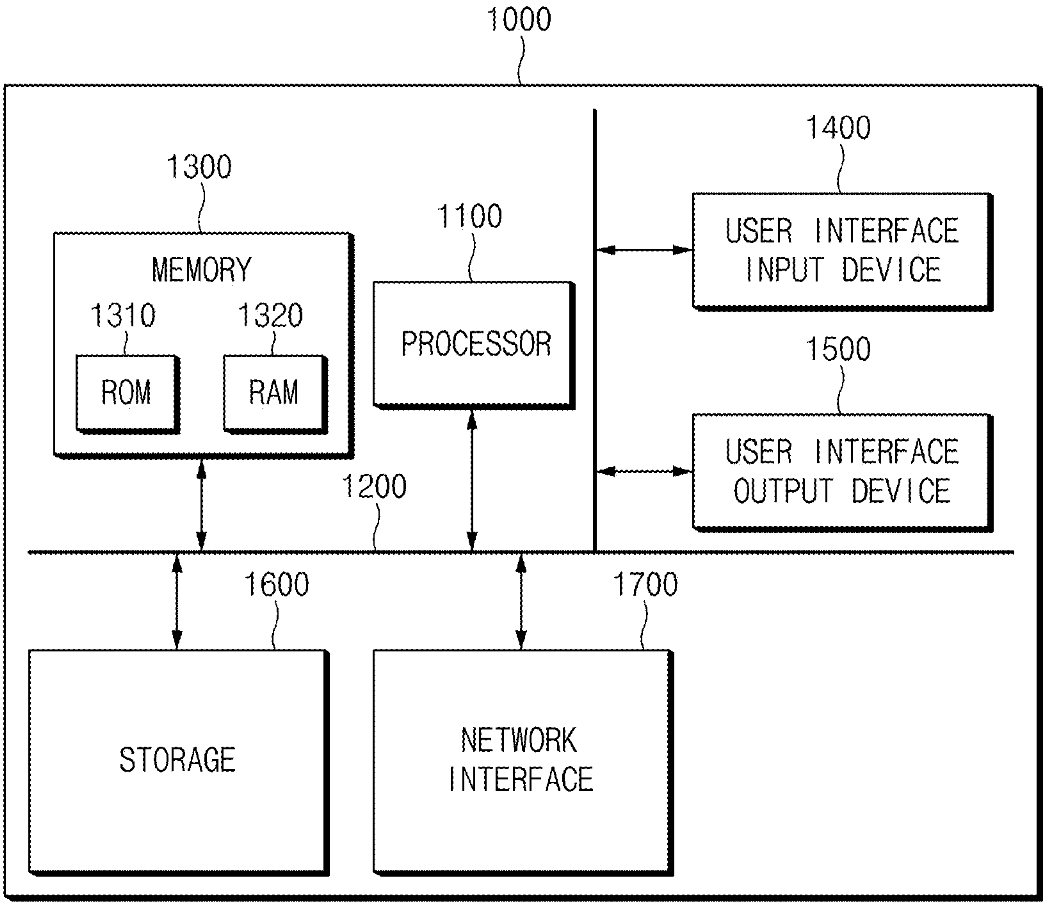
FIG. 8 is a view illustrating the configuration of a computing system to execute a method according to an embodiment of the present disclosure.

FIG. 8 is a view illustrating the configuration of a computing system to execute a method according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the apparatus and the method for controlling the vehicle, the motion sickness index to exactly show the motion sickness extent of the user may be predicted depending on the motion of a user.

According to an embodiment of the present disclosure, in the apparatus and the method for controlling the vehicle, the motion sickness model for predicting the motion sickness index of the user may be generated, based on the motion of the passenger and a misery scale (MISC) measured by the passenger.

According to an embodiment of the present disclosure, in the apparatus and the method for controlling the vehicle, the motion sickness index of the user may be predicted through the motion sickness model generated based on the motion of the passenger and the misery scale measured by the passenger, and the operation of the vehicle may be controlled based on the predicted motion sickness index to minimize the motion sickness of the user.

The above description is merely an example of the technical idea of the present disclosure, and various modifications and modifications may be made by one skilled in the art without departing from the essential characteristic of the invention.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a vehicle, the apparatus comprising:

at least one sensor configured to obtain status data of a passenger of the vehicle and data related to a motion of the passenger; and a processor configured to:

generate at least one motion sickness model, based on the status data of the passenger and the data related to the motion of the passenger, which are previously obtained;

select a motion sickness model corresponding to the status data of the passenger, from among the at least one motion sickness model;

predict a motion sickness index of the passenger, by inputting the data related to the motion of the passenger into the selected motion sickness model;

control an operation of the vehicle based on the motion sickness index;

allow an input of a misery scale for indicating a motion sickness extent sensed by the passenger; and adjust, based on the misery scale, at least one parameter of a time cumulation function in the at least one motion sickness model, wherein the time cumulation function is configured to accumulate a motion sickness severity over time to calculate the motion sickness index.

2. The apparatus of claim 1, wherein the sensor obtains the status data of the passenger and the data related to the motion of the passenger.

3. The apparatus of claim 1, wherein the status data includes:

a seating position and a gaze direction.

4. The apparatus of claim 1, wherein the at least one motion sickness model includes a first motion sickness model corresponding to a front seat and a second motion sickness model corresponding to a back seat.

5. The apparatus of claim 1, wherein the processor is configured to:

generate the motion sickness model to pre-process the data related to the motion of the passenger, input the pre-processed result into a conflict model, transform a conflict vector, which is output from the conflict model, into a sickness severity, and calculate a motion sickness index of the passenger, based on the sickness severity.

6. The apparatus of claim 5, wherein the processor is configured to:

transform the conflict vector, which is output from the conflict model, into the motion sickness severity through a hill function.

7. The apparatus of claim 5, wherein the processor is configured to:

calculate the motion sickness index of the passenger using a cumulation function based on the motion sickness severity.

8. The apparatus of claim 7, wherein the at least one parameter includes at least one of:

a first parameter set to a time during which the motion of the passenger is sensed, or a second parameter corresponding to a maximum value of the misery scale during the time in which the motion of the passenger is sensed.

9. The apparatus of claim 1, wherein the motion sickness model further comprises a conflict model, and a hill function, wherein the conflict model is configured to receive pre-processed data as an input and output a conflict vector, and wherein the hill function is configured to convert the conflict vector into the motion sickness severity.

10. A vehicle comprising the apparatus of claim 1.

11. A method for controlling a vehicle, the method comprising:

obtaining status data of a passenger of the vehicle and data related to a motion of the passenger by at least one sensor;

generating at least one motion sickness model, based on the status data of the passenger and the data related to the motion of the passenger, which are previously obtained;

selecting a motion sickness model corresponding to the status data of the passenger, from among the at least one motion sickness model;

predicting a motion sickness index of the passenger, by inputting the data related to the motion of the passenger into the selected motion sickness model; and controlling an operation of the vehicle based on the predicted motion sickness index, wherein generating the at least one motion sickness model comprises:

allowing an input of a misery scale for indicating a motion sickness extent sensed by the passenger; and adjusting, based on the misery scale, at least one parameter of a time cumulation function in the at least one motion sickness model, wherein the time cumulation function is configured to accumulate a motion sickness severity over time to calculate the motion sickness index.

12. The method of claim 11, further comprising:

obtaining the status data of the passenger and the data related to the motion of the passenger by the at least one sensor.

13. The method of claim 11, wherein the status data may include a seating position and a gaze direction.

14. The method of claim 11, wherein the at least one motion sickness model includes a first motion sickness model corresponding to a front seat and a second motion sickness model corresponding to a back seat.

15. The method of claim 11, further comprising:

generating the motion sickness model to pre-process the data related to the motion of the passenger, input the pre-processed result into a conflict model, transform a conflict vector, which is output from the conflict model, into a sickness severity, and calculate a motion sickness index of the passenger, based on the sickness severity.

16. The method of claim 15, further comprising:

transforming the conflict vector, which is output from the conflict model, into the motion sickness severity through a hill function.

17. The method of claim 15, further comprising:

calculating the motion sickness index of the passenger using a cumulation function based on the motion sickness severity.

18. The method of claim 17, wherein the at least one parameter includes at least one of:

a first parameter set to a time during which the motion of the passenger is sensed, or a second parameter corresponding to a maximum value of the misery scale during the time in which the motion of the passenger is sensed.

19. The method of claim 18, wherein the motion sickness model further comprises a conflict model, and a hill function, wherein the conflict model is configured to receive pre-processed data as an input and output a conflict vector, and wherein the hill function is configured to convert the conflict vector into the motion sickness severity.

* * * * *